United States Patent [19]

Guralnick

[11] 3,745,840

[45] July 17, 1973

[54] MOTION TRANSMITTING DEVICE
[75] Inventor: Sidney A. Guralnick, Chicago, Ill.
[73] Assignee: Traveling Nut Corporation, Chicago, Ill.
[22] Filed: June 3, 1971
[21] Appl. No.: 149,469

[52] U.S. Cl. .................. 74/89.15, 74/424.8, 82/24
[51] Int. Cl. ........................................... F16h 27/02
[58] Field of Search ................ 33/1 M; 74/89.15, 74/424.8; 64/18; 51/231; 82/24, 32

[56] References Cited
UNITED STATES PATENTS

| 1,799,311 | 4/1931 | Moore | 82/24 |
|---|---|---|---|
| 2,548,807 | 4/1951 | Morgan et al. | 74/41 |
| 3,214,942 | 11/1965 | Hill | 64/18 |
| 3,276,124 | 10/1966 | Jeffress et al. | 33/1 M |
| 3,326,016 | 6/1967 | Purcell | 64/18 |
| 3,398,484 | 8/1968 | Katsumura et al. | 74/89.15 |
| 3,442,593 | 5/1969 | Marcovecchio et al. | 74/424.8 |
| 3,464,283 | 9/1969 | Miller et al. | 74/424.8 |
| 3,495,519 | 2/1970 | Alfsen et al. | 33/1 M |

Primary Examiner—Charles J. Myhre
Assistant Examiner—Wesley S. Ratliff, Jr.
Attorney—Molinare, Allegretti, Newitt & Witcoff

[57] ABSTRACT

A device for transmitting motion in one preselected direction only for use with machine tools. The device includes a first machine element, such as a tool carriage, to be moved in one preselected direction. A rotating screw member is provided for causing translational movement of the carriage in the one preselected direction. Means interconnect the platform and the rotating screw, the interconnecting means including means which transmit only one degree of movement from the screw to the carriage. The interconnecting means effectively isolates the transmission of undesired components of motion in the transmission of a desired component of motion from the screw member to the carriage.

7 Claims, 5 Drawing Figures

Inventor:
Sidney A. Guralnick
By Molinare, Allegretti,
Newitt & Witcoff
Attys.

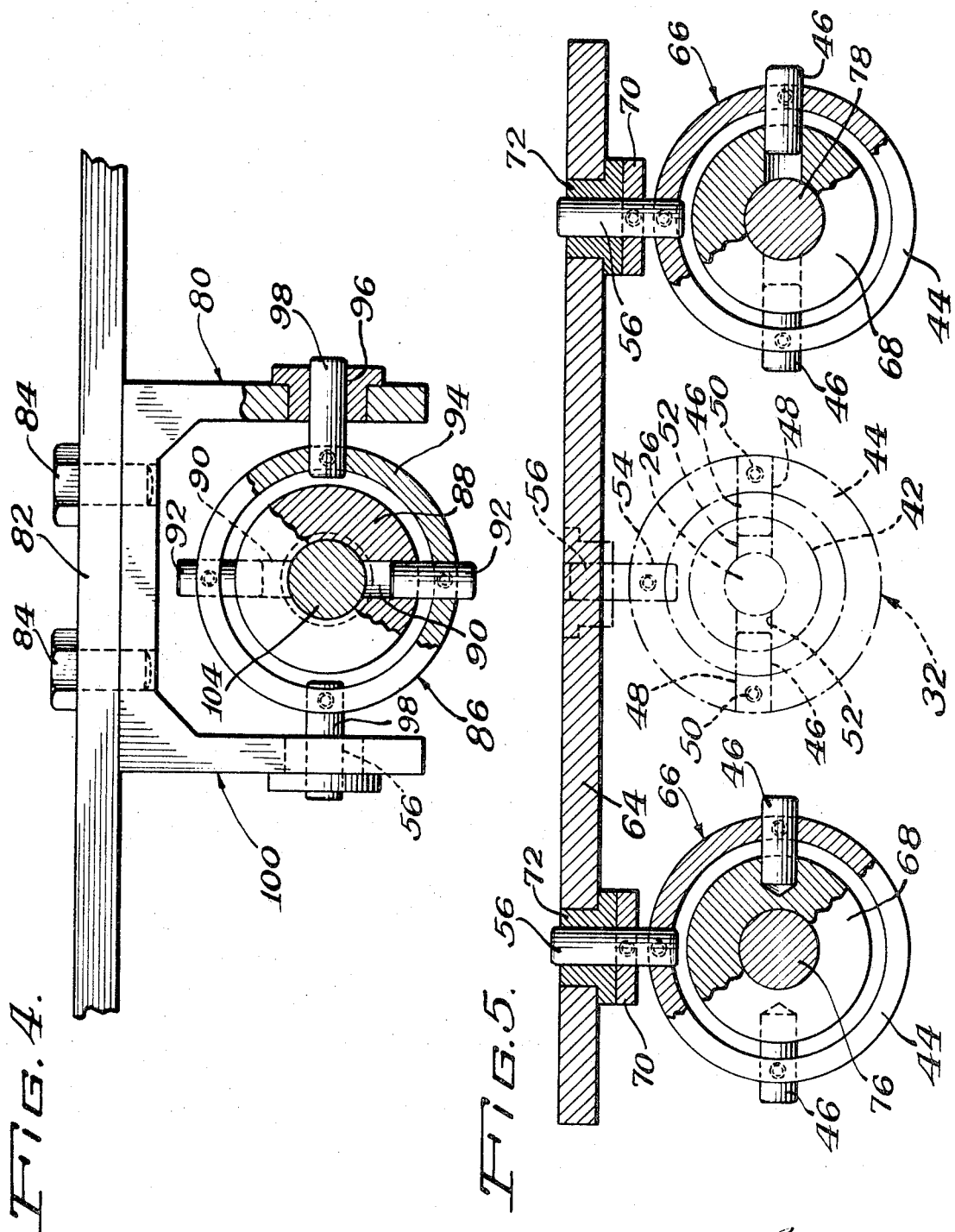

MOTION TRANSMITTING DEVICE

BACKGROUND OF THE INVENTION

FIELD OF THE INVENTION AND DESCRIPTION OF THE PRIOR ART

This invention relates to a motion transmitting device and it particularly relates to a motion transmitting device which converts the rotary motion of a lead screw, as in a machine tool, into linear motion, as to a tool supporting platform or carriage of a machine tool.

It is common for machine tools to have a tool support platform or a carriage as an integral portion thereof. These carriages are movable along parallel rails or "ways" by use of a lead screw, whose rotary motion must be converted into the desired linear motion to be imparted to the platform or carriage. Such mechanical devices are commonly used in connection with various types of screw jacks in machine tools, such as lathes, milling machines, surface grinders, jig borers, engraving machines, welders and the like. Such devices are also commonly used in X-Y plotters, in automatic drafting machines, and in numerically controlled plat plotters. As indicated above, such mechanical devices generally consist of a platform or carriage which is constrained for linear travel along a pair of parallel ways, the platform or carriage being moved by a lead screw by conversion of the rotary motion of the lead screw into linear motion imparted to the platform or carriage.

The coupling between a lead screw and a platform or carriage is commonly known as a "traveling nut." These traveling nuts are commonly restrained from rotation or turning relative to the lead screw and thus these traveling nuts are ordinarily rigidly attached to the platform or carriage to which it imparts the desired linear motion in proportion to the rotation of the lead screw. In order for there to be a high precision of travel for the carriage, including freedom from jamming and freedom from vibration of the carriage, it is necessary to reduce imperfections in the lead screw itself and to reduce misalignment of the lead screw relative to the ways or guide rails to the vanishing point. This is a costly, time-consuming and laborious operation requiring skilled personnel in the manufacture of machine tools of the type set forth above. Even after the necessary adjustments have been made as between the lead screw and the ways, continued use of the equipment commonly leads to loss of adjustment after an extended period of service for the equipment. This loss of adjustment necessitates costly and time-consuming repairs of the type required during initial manufacture.

A lead screw is commonly rotationally held in place in opposed bearings and is enclosed at some point along its length with a splined worm or the like, which is interconnected with gearing to drive the carriage. Thus, a lead screw is normally firmly held at three points along its length, and is thereby constrained at three points along its length. Geometrically speaking, it is a substantial impossibility to maintain absolute straight alignment between any three points. This "out-of-straightness" condition creates problems in the machining of precision parts.

In addition to problems created by restraining the lead screw at three points along its length, it is also considered a substantial impossibility to manufacture and maintain a lead screw in a perfectly straight condition. As a result of these factors, as the lead screw rotates, undesired movements are generated by the lead screw which will ultimately cause undesired movement of the carriage. This may cause the tool to pulsate, even under the best conditions, a certain amount. Such pulsing conditions generate undesired patterns on precision turning, for example, creating problems when it is necessary to provide fine finishes.

Although devices have been provided in the prior art to eliminate such problems, none are considered to be completely satisfactory. In one known system, a floating lead screw having only two fixed or rigid points, is provided. The connection of the feed screw to the drive shaft uses a double universal joint. Thus, any "pulsing" which takes place occurs at the end of the rod held by the double universal joint. Such an arrangement is, however, considered relatively complex and expensive.

SUMMARY OF THE INVENTION

It is therefore an important object of this invention to provide a device which substantially reduces or eliminates alignment problems commonly encountered when a traveling nut is used for interconnecting the carriage of a machine tool to a lead screw.

It is also an object of this invention to provide a traveling nut device which is designed to transmit motion in one direction only from a lead screw to a carriage while substantially isolating the other five components of motion.

It is yet another object of this invention to provide a floating traveling nut device which imparts only that component of motion to a platform or carriage in a machine tool or the like, which is substantially parallel to the ways upon which the platform or carriage is mounted, in response to the rotation of the lead screw.

It is yet another object of this invention to provide a traveling nut arrangement for a screw jack device which substantially avoids the expensive manufacturing procedures commonly required in the prior art to provide exact parallelism between a lead screw and the ways of a machine tool.

It is another object of this invention to provide means for transmitting one kinematic movement from a lead screw to a carriage, which supports a machine tool element, while isolating all other unwanted kinematic motions from the carriage.

Further purposes and objects of this invention will appear as the specification proceeds.

The foregoing objects are accomplished by my device for imparting and transmitting motion in one preselected direction, wherein the device includes a means which interconnects a first element which is moved in the one preselected direction and a second element for actuating the first element in the preselected direction. The interconnecting means includes means for transmitting only one component of motion from the second element to the first element which is used for imparting the movement in said preselected direction to said first element, the transmitting means effectively isolating all unwanted components of motion from the second element during the transmission of motion from the second element to the first element.

BRIEF DESCRIPTION OF THE DRAWINGS

Particular embodiments of the present invention are illustrated in the accompanying drawings wherein:

FIG. 4 is a detailed end elevational view of an alternate embodiment of my invention for transmitting rotary motion from a lead screw to a carriage or platform; and FIG. 5 is still another alternate embodiment of our invention showing a platform having a set of traveling guides used for interconnecting a platform to a master way and a slave way.

DETAILED DESCRIPTION OF THE PREFERRED EMBODIMENTS

Figure 1:
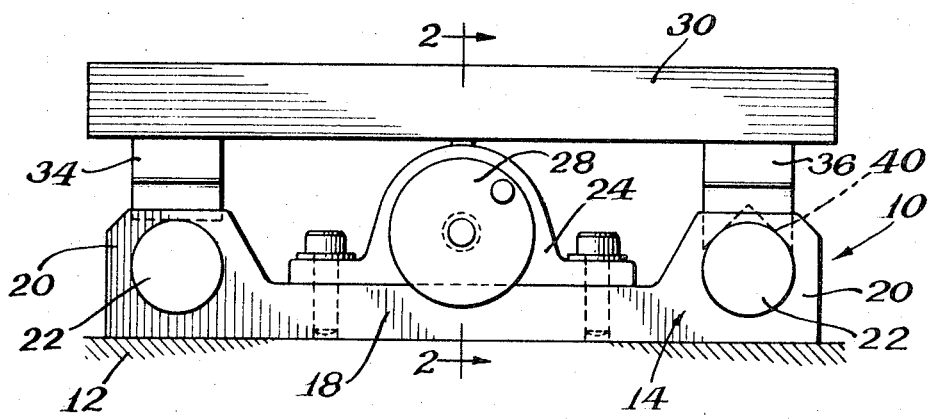
FIG. 1 is an end elevational view of one preferred form of my traveling nut arrangement for transmitting linear motion to a platform from a rotating member.
Figure 2:
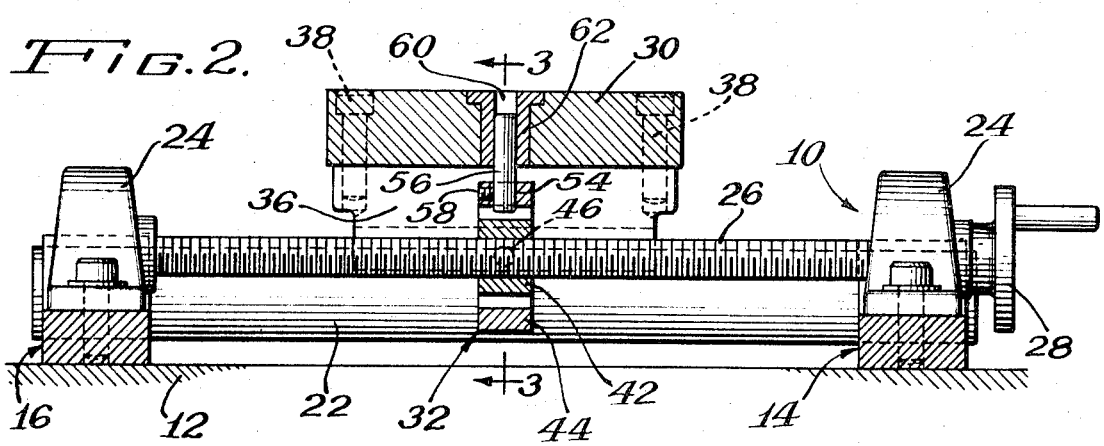
FIG. 2 is a cross-sectional view taken along the line 2—2 of FIG. 1.
Figure 3:
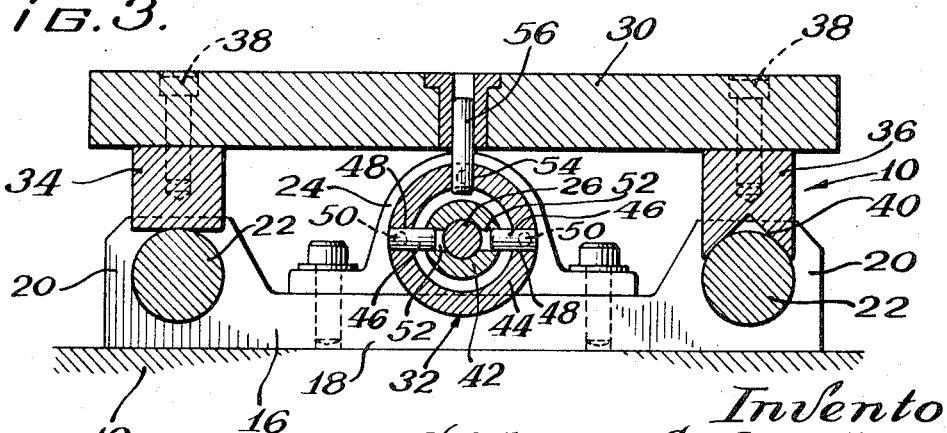
FIG. 3 is a cross-sectional view taken along the line 3—3 of FIG. 2.

Referring to the embodiment of my invention shown in FIGS. 1–3, my motion transmitting device, generally 10, is mounted on the frame 12 of a machine tool or the like. It is to be understood that my motion transmitting device 10 may be used as an integral operating part of a large variety of machine tools and the like equipment. Specifically, such machine tools are those machine tools which utilize screw jacks such as lathes, milling machines, surface grinders, jig borers, engraving machines, welders and the like. Such devices 10 are also commonly used in X-Y plotters, in automatic drafting machines and in numerically controlled plat plotters. Thus, my device 10 is not considered to be limited for use with any particular type of machine tool, as it is considered that the principles of the device 10 are useful in a large variety of ways with a large variety of equipment.

The device 10 includes a front support 14 and a rear support 16, which supports 14 and 16 are substantially parallel with each other and are mounted rigidly on the machine tool frame 12 in spaced relationship. The configuration of each of the supports 14 and 16 are substantially the same and each support includes a low-profile central portion 18 and a pair of enlarged end portions 20.

A pair of ways or guide rails 22 are rigidly received within suitable apertures provided in each of the spaced end portions 20 of the front and rear supports 14 and 16. Preferably, the ways 22 have a circular cross-section and periphery. The ways 22 are to be substantially parallel and substantially level relative to each other.

A pair of pillow blocks 24 are rigidly mounted centrally of the central portion 18 of both the front support 14 and the rear support 16. The pillow blocks 24 rotatably receive an elongated threaded member or lead screw 26. Desirably, the lead screw 26 is spaced equidistant between the parallel ways and is substantially parallel to each of the ways 22 and is level relative thereto.

In the embodiment shown, a crank member 28 is rigidly mounted to one end of the lead screw 26 and projects outwardly of the pillow block 24 at the front support 14. It is to be understood that any suitable drive means, both manual and power driven, conventionally used for machine tool drives may be utilized for selectively rotating the lead screw 26 at a desired rotational speed and in a desired rotational direction.

As it is the purpose of the device 10 to impart translational or linear movement to a member from the rotational movement of the lead screw 26, a movable table or carriage 30 is operatively connected to the lead screw 26 by a traveling nut member, generally 32, which member 32 is the critical portion of the described device and imparts the desired results to the invention. The moving platform or carriage 30 has a pair of way engaging members 34 and 36 rigidly mounted to its underside by threaded fasteners 38. The way engaging member 34 comprises an elongated member which is in slidable linear engagement with the upper surface of a way 22. The way engaging member 34 has a flat undersurface which engages the way 22. The way engaging member 34 has an inverted V-shaped groove 40 in its undersurface, which groove 40 straddles the opposite way 22 in sliding engagement therewith.

The carriage or platform 30 is a substantially rigid, rectangular plate movable longitudinally of the ways 22. The carriage 30 as well as the device 10 may be mounted in a variety of positions including horizontal, vertical, and any angular position therebetween. The platform or carriage 30 receives a machine tool member (not shown), such as a cutting tool, or other member which is relatively movable to another machine tool or the like.

The traveling nut 32 provides interconnection between the rotary lead screw 26 and the linearly movable platform or carriage 30. The traveling nut 32 includes a central nut portion 42, preferably made of bronze, which threadably engages the lead screw 26 and is linearly movable therealong in response to rotary movement of the lead screw 26 by the crank 28.

A retaining ring 44 is located substantially concentrically outwardly and co-planar of the nut 42. The ring 44, preferably made of steel, is movably interconnected to the nut 42 by a pair of pin members 46, also preferably made of steel. More specifically, diametrically opposed apertures are located within the ring 44 for receiving the pins 46. The pins 46 are held rigidly in place within the apertures 48 by suitable rivets or the like. The pins 46 extend inwardly of the ring 44 directly towards each other a substantial distance and are slidably received within aligned openings 52 in the nut 42. It is thus seen that the retaining ring 44 is interconnected to the nut 42 along the X-axis, that is, the axis which is substantially at right-angle to the lead screw axis and co-planar therewith, the axis of the lead screw being the Z-axis of an X-Y-Z coordinate system. The interconnection provided by the pins 46 thereby permits for relative movement along the X-axis as between the retaining ring 44 and the nut portion 42 of the traveling nut 32.

An aperture 54 is located in the ring 44 at a position intermediate and at right angles to the apertures 48 which slidably receive the pins 46. A pin 56, similar to the pins 46, is rigidly interconnected to the ring 44 by a rivet 58 so that the pin 56 is located on an axis which is at right angles to both the X-axis and the Z-axis, that is, on the Y-axis.

An opening 60 in the platform 30 has a bushing 61, preferably made of bronze, rigidly mounted therein. The pin 56 extends upwardly, or along the Y-axis through the central apertures of the bushing 62 and is in slidable and rotatable engagement therewith.

From the foregoing description of the device 10, it can be seen that linear movement is imparted to the moving platform 30 by rotary movement of the lead screw 26. In the embodiment of FIGS. 1-3, it is seen that there is a mechanical arrangement useful in large number of mechanical devices wherein a carriage 30 travels along parallel ways or rails 22 by rotation of a lead screw 26 by conversion of rotary motion into linear travel. As in the prior art, the nut 32 is restrained from rotary movement so that it imparts the desired linear motion to the carriage 30 in proportion to the rotation of the lead screw 26. In the embodiment described, a high degree of precision of travel is imparted to the platform 30 and the movement of the carriage 30 is substantially free from jamming and from vibration. The device 10 compensates for imperfections in the lead screw 26 and it also compensates for misalignment of the lead screw relative to the ways. The device 10 also substantially reduces the costly, time consuming and laborious operation commonly found in properly manufacturing such equipment with the required degree of precision alignment of ways and lead screws. Also, the device 10, and specifically the traveling nut 32, substantially eliminates or avoids repair of misalignments as are required from time to time in mechanical devices using equipment of the type shown. With the device 10, the time consuming and costly repairs are substantially avoided as the nut 32 isolates unwanted motion caused by initial misalignments or by misalignments caused by wear of parts.

The foregoing results have been accomplished by the device 10 since the traveling nut 32 imparts only that one component of motion to the platform 30 which is parallel to the ways 22 when the lead screw 26 is rotated, and the traveling nut 32 effectively isolates the other five components of motion. An arbitrary body which travels freely in space has basically six degrees of freedom of motion with respect to a three dimensional frame of reference, that is, X-Y-Z coordinates, including linear and rotational movement relative to each coordinate. My device imparts only the one desired component of movement to the platform 30, which motion is parallel to the ways 22. When the device 10 is used, it is unnecessary for the lead screw 26 to be perfectly aligned in parallel raltionship with the ways 22. Also, it is not necessary for the lead screw 26 to be perfectly straight and free from "whirling" motion when rotated with the device 10. The traveling nut 32 accomplishes the transmission of only that one desired component of motion parallel to the ways 22.

In order to operate the device 10, the lead screw 26 is rotated in a suitable manner, as by the crank 28, whereby motion is imparted to the traveling nut 32 along the Z-axis which is parallel to the ways 22. This causes the moving platform or carriage 30 to traverse in the Z-direction along the ways 22. The lead screw 26, may, because of imperfections in alignment, impart undesirable components of motion to the traveling nut 32 in the X direction which is perpendicular to the Z-direction and lies in a horizontal plane and/or in the Y-direction, which is perpendicular to both the Z-direction and the X-direction and there may even be undesired rotary movement about one or both of the X or Y axes. These undesirable components of motion are isolated from the platform 30 by the traveling nut arrangment including the pins 46 and 56, the retaining ring 44, and the bushing 62. The pins 46, being freely slidable and rotatable in the apertures or openings 52 in the nut portion 42, permit the traveling nut 32 to translate or move linearly along and/or rotate about the X-axis without transmitting these motion components to the moving platform 30. Also, the pin 56 is locked to the ring 44 and the pin 56 slides and rotates freely in the opening 60 provided in the bushing 62. This movement permits the traveling nut 32 to translate and/or rotate about the Y-axis without transmitting these undesirable components of motion to the moving platform 30. Thus, except for the small amount of friction in the bearings formed by the pins 46 moving in the openings 52 in the nut portion 42 and formed by the pin 56 moving in the bushing 62, there is no component of motion other than the linear component parallel to the ways 22 which is transmitted from the lead screw 26 to the platform 30.

Also, in the embodiment of FIGS. 1 – 3, certain advantages are obtained by providing the threads on the lead screw 26 with a pitch which is slightly greater than normal for a particular application. For example, if the lead screw platform 30 is to be used as a dividing engine (not shown), a machine used for making precise division markings on a measuring instrument, it is possible to take advantage of the traveling nut arrangement 32 to obtain extreme accuracy without a corresponding increase in labor and precision adjustments. When the lead screw 26 with the over-sized pitch is assembled in a dividing engine, it is only necessary to deliberately misalign the lead screw 26 with respect to parallelism with the ways 22 in order to achieve substantially exact coincidence between the desired amount of linear travel of the platform relative to one revolution of the lead screw 26. By using such an over-sized pitch for the lead screw 26 in combination with misalignment of the lead screw 26 with respect to the ways 22, it is relatively simple procedure to change the dividing engine from one set of graduation to another, for example, from the English to the metric system, by simply exchanging a collar dial (not shown), and by suitably readjusting the deliberate misalignment of the lead screw. This is in contrast to current practice, wherein it is necessary to replace the lead screw and traveling nut to accomplish a change of graduations or divisions for the dividing engine.

Referring to FIG. 5, a system is shown wherein alignment adjustments needed between the ways 22 is minimal. In FIG. 5, a traveling table 64 is supported by traveling guides 66. The traveling guides 66 are made substantially in accordance with the traveling nut of the embodiment of FIGS. 1 – 3 except that an unthreaded traveling guide 68 is substituted for the traveling nut portion 42 of the embodiment of FIGS. 1 – 3. Furthermore, a locking collar 70 is rigidly fixed to the pins 56, the undersurface of the bushings 72 resting on the locking collars 70. Still, further, the pins 46 are not movable along the X-axis as they bottom against wells provided in the traveling guide 68 which rides on the master way 76. The embodiment of FIG. 5 may be used in the manner shown with a traveling nut and lead screw arrangement, shown in phantom view FIG. 5 for transmitting linear movement to the support or traveling table 64. Thus, the embodiment of FIG. 5 may be used wherever there may be misalignment between the ways 22.

As an example of the operation of the embodiment of FIG. 5, one way 76 is considered the master way and the other way 78 is considered the slave way. The master way 76 serves as the guide upon which the floating support or traveling table 64 rides, while the slave way 78 serves as a level support for the traveling table 64. The slave way 78 is only roughly in level alignment with the master way 76 and it need not be precisely parallel or even co-planar with the master way 76. Thus, a serious misalignment of the slave way 78 relative to the master way does not prevent movement of the table 64 in a direction which is parallel to the master way 76. A further advantage of the embodiment of FIG. 5, is that the table 54 can be readily leveled. If the ways 76 and 78 are level, or at least parallel to one another, the table 64 is leveled simply by adjusting the collars 70 relative to the pins 56 and locking them in position with the set screws in the collars 70.

Referring to the embodiment of FIG. 4, there is shown a preferred form of the invention which is a self-contained unit which may be readily fabricated as part of large mechanical ssemblies. In this embodiment, a yoke support 80 is rigidly secured to the underside of the traveling table 82 by bolts 84 which are threadably received by the yoke 80. The yoke 80 also completely supports a traveling nut assembly, generally 86. In this embodiment, the nut portion 88 includes a pair of pin receiving apertures 90 located diametrically opposite each other along the Y-axis. Pins 92 are rigidly secured, as by set screws in ring 94 which surrounds the nut 88 in substantial concentric and co-planar relationship. The ring 94, in turn, rigidly receives pins 98 therein. The pins slidably and rotatably engage bushings 100 in the downturned legs of the yoke member 80 to permit translation and rotation about the X-axis.

As with the embodiment of FIGS. 1 – 3, the traveling nut 86 of the embodiment of FIG. 4 provides for isolation of five of the six components of motion by the arrangement shown, while permitting transmission of the desired component of motion to the table 82 upon rotation of the lead screw 104. The embodiment of FIG. 4 avoids the necessity of providing a well fitted bushing in the table 82, such as the bushing 62 in the embodiment of FIGS. 1–3. The entire traveling nut unit 86, may be included as part of a self-contained unit supported by the yoke 80.

Also, in any of the foregoing embodiments, wherever there is sliding and/or rotation between parts, it is to be understood that friction minimizing materials including Teflon linings, nylon linings, bronze linings, ball bearings, roller bearings, and any combination thereof can be readily used.

While in the foregoing there has been provided a detailed description of particular embodiments of the present invention, it is to be understood that all equivalents obvious to those having skill in the art are to be included within the scope of the invention as claimed.

What I claim and desire to secure by Letters Patent is:

1. A device for transmitting translational movement along the Z-axis only, said device comprising, in combination, a carriage for supporting a machine element for movement along the said Z-axis, an elongated rotating lead screw member, said lead screw being substantially parallel with the said Z-axis, a pair of substantially parallel guide way members for supporting said carriage and also being substantially parallel with said lead screw, and means interconnecting said carriage and said lead screw, said interconnecting means including a nut member threadably interengaging said lead screw, apertures in said nut member located along the X-axis and located on opposite sides of said screw, a rigid floating member intermediate said nut member and said carriage, a pair of pin members rigidly fixed to said floating member and being slidably received within each of said apertures in said nut member, a substantially vertical aperture along the Y-axis in said carriage, and a pin member rigidly affixed to said floating member and being rotatably and translationally received within said aperture in said carriage said interconnecting means effectively isolating the transmission of undesired components of motion along and about the X and Y-axes from said lead screw member to said carriage while transmitting motion to said carriage only along the said Z-axis.

2. The device of claim 1 including substantially parallel guide means for supporting said carriage, said guide means being substantially parallel to said preselected direction, said lead screw is misaligned relative to said guide means, and said lead screw has threads with an oversized pitch.

3. A device for interconnecting a lead screw positioned substantially along the Z-axis to a moving carriage movable along the Z-axis, said interconnecting means comprising a nut threadably engaging said rotating screw member, a yoke secured to said carriage, a ring interposed between said nut and said yoke, a pair of apertures along the Y-axis in said nut, a pair of apertures in said yoke along said X-axis, a pair of pins rigidly affixed to said ring member and being rotatably and translationally received within said apertures in said nut, and a pair of pin members rigidly affixed to said floating member and being rotationally and translationally received within the aperture in the said yoke member, said interconnecting means effectively isolating the transmission of undesired components of motion along and about the X and Y axes from said lead screw to said carriage while transmitting motion to said carriage only along the said Z-axis.

4. A device for transmitting motion in one direction only, said device comprising, in combination, a carriage to be moved in said one direction, a rotary screw member mounted substantially longitudinally of said preselected direction, substantially parallel way members for supporting said carriage during movement in said preselected direction, said way members being substantially parallel to said preselected direction, said rotary screw member being angularly misaligned relative to said way members and the threads on said screw member having an oversized pitch, and means interconnecting said screw member to said carriage, said interconnecting means including means for isolating all components of motion, except for that component of motion which imparts motion in said one direction, from said rotary screw member to said carriage, and said interconnecting means also including a nut member which meshes with said rotary screw member having said oversized pitch on the threads thereof.

5. A device for transmitting motion, said device comprising a carriage, means for moving said carriage, a pair of misaligned way members, one of said way members being a master way and the other of said way members being a slave way, means connecting said carriage and each of said way members, said connecting means including a traveling guide member slidably carried on said slave way, apertures in said traveling guide member located along an X-axis and on opposite sides of said slave way, a second floating member intermediate said carriage and said traveling guide, a pair of pin members fixed to said second floating member, and rotationally and slidably received within each of said apertures in said traveling guide, a substantially vertical aperture along a Y-axis in said carriage, and a pin member fixed to said floating member and slidably and rotationally received in said aperture in said carriage.

6. The device of claim 5 wherein said connecting means includes a second traveling guide member slidably carried on said master way, apertures in said second traveling guide member located along the X-axis and on opposite sides of said master way, a third floating member intermediate said carriage and said second traveling guide member, a pair of pin members fixed to said third floating member and rotationally received within each of said apertures in said second traveling guide, a substantially vertical aperture along a Y-axis in said carriage, and a pin member fixed to said floating member and slidably and rotationally received in said aperture in said carriage.

7. The device of claim 6 including locking collar members fixed to each of said pin members fixed to said floating members and said locking collars bearing against the underside of said carriage.

* * * * *